US009846043B2

(12) United States Patent
Aoki et al.

(10) Patent No.: US 9,846,043 B2
(45) Date of Patent: Dec. 19, 2017

(54) MAP CREATION APPARATUS, MAP CREATION METHOD, AND COMPUTER-READABLE RECORDING MEDIUM

(71) Applicants: Satoshi Aoki, Kanagawa (JP); Tamon Sadasue, Kanagawa (JP); Yasuhiro Kajiwara, Kanagawa (JP); Kazuhiro Takazawa, Tokyo (JP); Kazufumi Matsushita, Kanagawa (JP); Yasuko Hashimoto, Kanagawa (JP); Yasuko Shirataka, Kanagawa (JP)

(72) Inventors: Satoshi Aoki, Kanagawa (JP); Tamon Sadasue, Kanagawa (JP); Yasuhiro Kajiwara, Kanagawa (JP); Kazuhiro Takazawa, Tokyo (JP); Kazufumi Matsushita, Kanagawa (JP); Yasuko Hashimoto, Kanagawa (JP); Yasuko Shirataka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 62 days.

(21) Appl. No.: 14/967,761

(22) Filed: Dec. 14, 2015

(65) Prior Publication Data
US 2016/0196654 A1 Jul. 7, 2016

(30) Foreign Application Priority Data
Jan. 7, 2015 (JP) .................. 2015-001708

(51) Int. Cl.
*G01C 21/26* (2006.01)
*G01C 21/32* (2006.01)
(Continued)

(52) U.S. Cl.
CPC ............. *G01C 21/26* (2013.01); *G01C 21/32* (2013.01); *G06K 9/00805* (2013.01);
(Continued)

(58) Field of Classification Search
None
See application file for complete search history.

(56) References Cited

U.S. PATENT DOCUMENTS

2005/0129324 A1* 6/2005 Lemke .................. H04N 1/387
382/254
2010/0027844 A1* 2/2010 Akita ...................... G06T 7/269
382/103
(Continued)

FOREIGN PATENT DOCUMENTS

| JP | 2005-091176 | 4/2005 | |
|---|---|---|---|
| JP | 2014-095553 | 5/2014 | |
| KR | WO 2016076449 A1 * | 5/2016 | ............... G06T 7/12 |

*Primary Examiner* — Matthew Bella
*Assistant Examiner* — Soo Shin
(74) *Attorney, Agent, or Firm* — Cooper & Dunham LLP

(57) ABSTRACT

A map creation apparatus includes an image receiver configured to receive images in time series while moving; a first calculator configured to extract an image area indicating an object from the images and calculate a coordinate of the object in a world coordinate system; a second calculator configured to track the object in the extracted image area with the images and calculate an optical flow of the object; an eliminator configured to calculate a difference in coordinate between vanishing points generated by the movement of the image receiver and the object based on the optical flow, and eliminate the image area of the object from the images when determining the object as a moving object based on the calculated difference; and a storage controller configured to store map information including the coordinate of the object, not eliminated by the moving object eliminator, in the world coordinate system.

8 Claims, 9 Drawing Sheets

(51) Int. Cl.
*G06K 9/00* (2006.01)
*G06K 9/46* (2006.01)
*G06T 7/73* (2017.01)
*G06T 7/215* (2017.01)
*G06T 7/246* (2017.01)

(52) U.S. Cl.
CPC .............. *G06T 7/215* (2017.01); *G06T 7/246* (2017.01); *G06T 7/73* (2017.01); *G06K 9/4647* (2013.01); *G06K 9/4671* (2013.01); *G06T 2207/10021* (2013.01); *G06T 2207/30241* (2013.01); *G06T 2207/30261* (2013.01)

(56) References Cited

U.S. PATENT DOCUMENTS

| | | | | |
|---|---|---|---|---|
| 2013/0016877 | A1* | 1/2013 | Feris | G06K 9/00771 382/103 |
| 2014/0037138 | A1* | 2/2014 | Sato | G08G 1/166 382/103 |
| 2015/0022698 | A1* | 1/2015 | Na | H04N 5/23222 348/241 |
| 2016/0203629 | A1* | 7/2016 | Takeda | G01C 21/3626 345/632 |

* cited by examiner

MAP CREATION APPARATUS, MAP CREATION METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2015-001708 filed in Japan on Jan. 7, 2015.

BACKGROUND OF THE INVENTION

1. Field of the Invention

The present invention relates to an apparatus, a method, and a computer-readable recording medium for map creation.

2. Description of the Related Art

Conventionally in an automotive navigation system of providing a routing assistance at the current location and to a destination in car driving, a self-position of a car is basically identified based on positional information from the GPS (Global Positioning System) satellite. Since there is a difficulty in receiving electric waves of the GPS in an inside of a tunnel, in a space sandwiched by high-rise buildings, under an elevated road, in a wooded area, and the like due to a strong rectilinear property of the electric waves and errors may arise only by the GPS, the self-position of the car is identified by using, in combination with the GPS, a stand-alone navigation based on information of an acceleration sensor and a gyroscope in the automotive navigation system, car speed signals associated with the rotation of tires, and the like.

Besides, since errors may arise due to a condition of a road surface and tires in a stand-alone navigation, a method of applying the self-position to road data on a map with software technique called "map matching" to compensate for errors by the GPS, the gyroscopic sensor, and the like has been used.

In addition, as a technique of using a laser range sensor, a camera, an encoder, and the like to grasp the self-position to an accuracy of several to several tens of centimeters, an SLAM (Simultaneous Localization And Mapping), which is a technique of performing an estimation of self-position and a creation of an environmental map at the same time, has been known. Especially, an SLAM using a camera is called "Visual SLAM". It is possible in the Visual SLAM technique, since a local map is created by the sensor and the self-position of the car is identified from map information, to identify the self-position of the car accurately even in the situation with the difficulty in the reception of electric waves of the GPS. Moreover, since the Visual SLAM technique uses external information, which is different from the gyroscopic sensor and the acceleration sensor, it is possible to identify the self-position of the car regardless of conditions of a road surface and tires.

Japanese Laid-open Patent Publication No. 2014-095553 discloses a camera posture estimation apparatus capable of improving an accuracy of estimating a rotation angle (camera posture) indicating a position and an attitude, with respect to a subject, of a camera that captures an image of the subject by using the Visual SLAM technique. Since in estimating a three-dimensional position of an area corresponding to a template image, estimating the three-dimensional position of the template image after eliminating outliers from feature point included in the area, the camera posture estimation apparatus disclosed in Japanese Laid-open Patent Publication No. 2014-095553 is capable of improving an accuracy of the three-dimensional position by suppressing an affect by outliers.

To drive a car while identifying the self-position of the car by using the Visual SLAM technique, it is necessary to initialize a map used for an estimation of an initial self-position. It is required in this map not to include three dimensional point information of moving objects such as a human being and a car since the map requires only three dimensional point information of a motionless object such as a building, a road, and a traffic sign.

However, in the camera posture estimation apparatus disclosed in Japanese Laid-open Patent Publication No. 2014-095553, there is a problem that the map cannot be initialized at an arbitrary timing irrespective of the presence of moving objects such as a human being and a car in creating, in advance, a map not including three dimensional point information of moving objects.

Therefore, there is a need for an apparatus, a method, and a computer-readable recording medium for map creation, capable of creating an initial map which is applicable to an estimation of self-position.

SUMMARY OF THE INVENTION

It is an object of the present invention to at least partially solve the problems in the conventional technology.

According to an embodiment, there is provided a map creation apparatus that includes an image receiver configured to receive images in time series while moving; a first calculator configured to extract an image area indicating an object from the images input from the image receiver and calculate a coordinate of the object in a world coordinate system; a second calculator configured to track the object in the extracted image area with the images input in sequence and calculate an optical flow of the object; a moving object eliminator configured to calculate a difference between a coordinate of a first vanishing point generated by the movement of the image receiver and a coordinate of a second vanishing point generated by a movement of the object based on the optical flow calculated by the second calculator, and eliminate the image area of the object from the images when determining the object as a moving object based on the calculated difference; and a storage controller configured to cause a storage unit to store map information including the coordinate of the object, not eliminated by the moving object eliminator, in the world coordinate system.

According to another embodiment, there is provided a map creation method that includes receiving images in time series by an image receiver while the image receiver moves; extracting an image area indicating an object from the images received at the receiving and calculating a coordinate of the object in a world coordinate system; tracking the object in the extracted image area with the images input in sequence and calculating an optical flow of the object; calculating a difference between a coordinate of a first vanishing point generated by the movement of the image receiver and a coordinate of a second vanishing point generated by a movement of the object based on the optical flow calculated at the tracking, and eliminating the image area of the object from the images when determining the object as a moving object based on the calculated difference; and causing a storage unit to store map information including the coordinate of the object, not eliminated at the calculating, in the world coordinate system.

According to still another embodiment, there is provided a non-transitory computer-readable recording medium with an executable program stored thereon and executed by a computer. The program instructs the computer to perform receiving images in time series by an image receiver while the image receiver moves; extracting an image area indicating an object from the images received at the receiving and calculating a coordinate of the object in a world coordinate system; tracking the object in the extracted image area with the images input in sequence and calculating an optical flow of the object; calculating a difference between a coordinate of a first vanishing point generated by the movement of the image receiver and a coordinate of a second vanishing point generated by a movement of the object based on the optical flow calculated at the tracking, and eliminating the image area of the object from the images when determining the object as a moving object based on the calculated difference; and causing a storage unit to store map information including the coordinate of the object, not eliminated at the calculating, in the world coordinate system.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an apparatus, a method, and a computer-readable recording medium for map creation according to the present invention will be explained in detail below with reference to the accompanying drawings. The present invention is not limited to the embodiment below. The embodiment, may be combined appropriately within a scope where consistency in content is maintained.

A map creation apparatus according to an embodiment extracts an image area indicating an object from time series images received by an image receiver and calculates a coordinate of the object in the world coordinate system. Next, the map creation apparatus tracks the object in the extracted image area in the time series images received in sequence and calculates an optical flow of the object. Next, the map creation apparatus calculates a difference between a first vanishing point coordinate generated by a movement of the image receiver and a second vanishing point coordinate generated by a movement of the object based on the calculated optical flow (movement vector of the object). Next, the map creation apparatus eliminates the image area of the object from the time series images when the object is determined to be a moving object based on the calculated difference. When a newly extracted object is determined to be the same object as the object under tracing, the map creation apparatus eliminates the newly extracted object and stops the tracking. The map creation apparatus updates and stores map information including a coordinate, of an object not eliminated, in the world coordinate system. It is thus possible to create an initial map applicable to the Visual SLAM.

An example of realizing the map creation apparatus according to the embodiment as a part of a self-position estimation apparatus using the Visual SLAM will be explained below. The device to which the map creation apparatus according to the embodiment is applicable is not limited to the self-position estimation apparatus.

Figure 1:
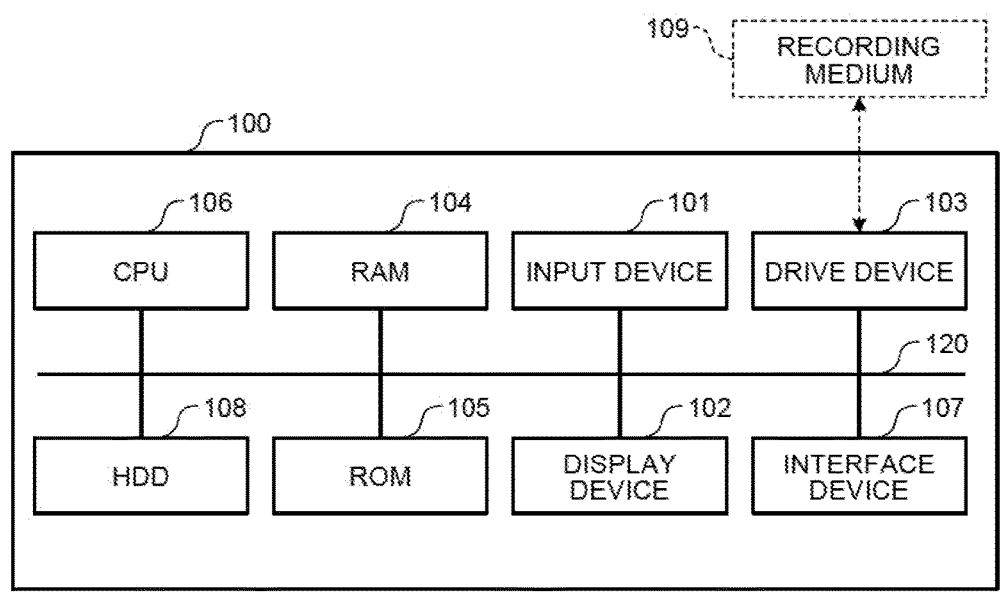
FIG. 1 illustrates an example of a hardware configuration of a self-position estimation apparatus according to an embodiment.

First, an example of a hardware configuration of a self-position estimation apparatus 100 will be explained with reference to FIG. 1. FIG. 1 illustrates an example of a hardware configuration of a self-position estimation apparatus according to the embodiment.

As illustrated in FIG. 1, the self-position estimation apparatus 100 is provided with an input device 101, a display device 102, a drive device 103, a RAM (Random Access Memory) 104, a ROM (Read Only Memory) 105, a CPU (Central Processing Unit) 106, an interface device 107, and an HDD (Hard Disk Drive) 108, which are connected to a system bus 120. A recording medium 109 is connected to the drive device 103.

The input device 101 is an interface enabling an input of operation signals and various kinds of data to the self-position estimation apparatus 100. The input device 101 is a camera that captures images in time series while the camera moves, for example. In the embodiment, the camera includes a plurality of cameras (stereo camera) capable of obtaining a distance image based on disparity, for example. Here, the camera is not limited to the plurality of cameras and a monocular camera capable of obtaining a distance image from a plurality of frame images captured in time series may be used.

The input device 101, which is constituted by a keyset, a mouse, a display, and the like, is a user interface that receives various operational instructions from a user. A touch screen and an audio input device may be used as the input device 101, for example.

The display device 102 displays a GUI (Graphical User Interface) and the like based on programs. The display device 102, which includes a display that displays images, for example, displays a result of a processing by the self-position estimation apparatus 100 and the like. The display is, for example, an FPD (Flat Panel Display) such as a liquid crystal and an organic EL.

The drive device 103 is an interface with the detachable recording medium 109. The self-position estimation apparatus 100 is capable of reading from and writing in the recording medium 109 via the drive device 103. For the recording medium 109, a Floppy® disk, a CD (Compact Disk), a DVD (Digital Versatile Disk), an SD memory card (Secure Digital memory card), a USB memory (Universal Serial Bus memory), and the like may be used, for example.

The RAM 104 is a volatile semiconductor memory (storage device) that temporarily stores various programs and data. The RAM 104 is a memory that the CPU 106 uses in data processing. An SDRAM, a DRAM, an SRAM, and the like may be used instead of the RAM 104.

The ROM 105 is a non-volatile semiconductor memory (storage device) capable of retaining internal data even when a power is turned off. In the ROM 105, programs and data for a BIOS (Basic Input/Output System) to be executed in an activation of the self-position estimation apparatus 100, information processing system settings, and network settings are stored.

The CPU 106 totally controls an operation of the self-position estimation apparatus 100. The CPU 106 reads out the programs and data stored in the ROM 105 and the HDD 108 onto the RAM (memory) 104 and performs a processing to control an entire operation of the self-position estimation apparatus 100. The CPU 106 realizes various functions.

The interface device 107 is an interface enabling a connection to a network, for example. The self-position estimation apparatus 100 is capable of performing a data communication with an external device connected to the network via the interface device 107.

The HDD 108 is a non-volatile storage device that stores various data and programs to be executed in the self-position estimation apparatus 100. The HDD 108 stores programs and data necessary for realizing various functions of the self-position estimation apparatus 100. The programs and data stored include an OS (Operating System) as basic software of an information processing system ("Windows®" and "UNIX®") that controls the entirety of the self-position estimation apparatus 100 and applications that provide various functions on the system. The HDD 108 administers the programs and data stored by a predetermined file system and/or a DB (DataBase).

The programs for the self-position estimation apparatus 100 may be distributed by being recorded in a file of an installable format or an executable format in a computer-readable recording medium.

A hardware configuration of a map creation apparatus 10 to be explained later is the same as that of the self-position estimation apparatus 100 and therefore a detailed explanation thereof will be omitted below.

Figure 2:
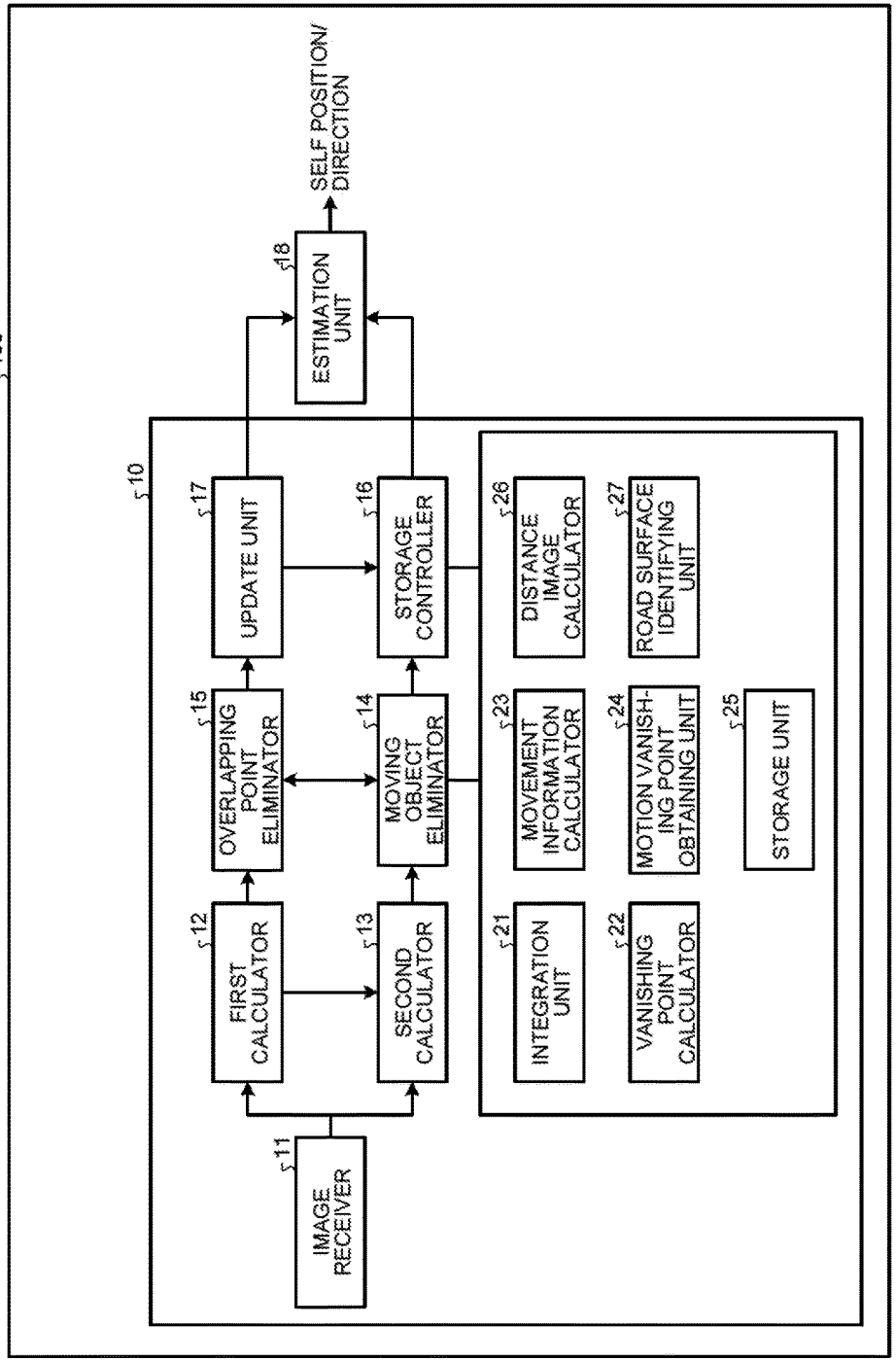
FIG. 2 is a block diagram of an example of a functional configuration of the self-position estimation apparatus according to the embodiment.

Next, a functional configuration of the self-position estimation apparatus 100 will be explained with reference to FIG. 2. FIG. 2 is a block diagram of an example of a functional configuration of the self-position estimation apparatus.

As illustrated in FIG. 2, the self-position estimation apparatus 100 is provided with an image receiver 11, a first calculator 12, a second calculator 13, a moving object eliminator 14, an overlapping point eliminator 15, a storage controller 16, an update unit 17, and an estimation unit 18. Besides, the self-position estimation apparatus 100 is provided, as function units working in cooperation with the moving object eliminator 14 and the storage controller 16, an integration unit 21, a vanishing point calculator 22, a movement information calculator 23, a motion vanishing point obtaining unit 24, a storage unit 25, a distance image calculator 26, and a road surface identifying unit 27. A part of these units may be software (program) or a part or all of these units may be a hardware circuit.

The image receiver 11 receives images in time series while (the self-position estimation apparatus 100) moving. The image receiver 11 is, for example, an imaging device (camera), such as a digital camera and a video camera capable of receiving images while the camera moves, including an image sensor. The camera in the embodiment includes a plurality of cameras (stereo camera and the like) capable of obtaining a distance image based on disparity, for example. Here, the camera is not limited to the plurality of cameras and a monocular camera capable of obtaining a distance image from a plurality of frame images captured in time series may be used. It is only necessary for the image receiver 11 to obtain a series of image data constituting a video data and the image receiver 11 may be a device that obtains video data captured in advance.

The first calculator 12 extracts an image area indicating an object from the time series images input from the image receiver (camera) 11 to calculate a three dimensional position coordinate of the object in the world coordinate system. The image receiver will also be described as "camera" below. Specifically, the first-calculator 12 extracts an object (motionless object and moving object) from the time series images input in succession to extract a feature point of the extracted object. The first calculator 12 then calculates a three dimensional position coordinate (three dimensional point: X, Y, Z) of the feature point in the world coordinate system based on the disparity image of the time-series images received by the plurality of image receivers (cameras) 11. Here, the feature point means a feature (corner) like a corner of a building on an image, for example.

To extract an assured feature point from an image and estimate the content of the image, a corner detection by Mravec in which a corner is treated as a feature point, a corner detection by Harris, a FAST (Features from Accelerated Segment Test), and the like are exemplified as a method of extracting feature points, for example.

In addition, a Difference-of-Gaussian (DoG) of detecting a scale and a feature point at the same time, an approximation Hessian-Laplace, and the like are exemplified. Moreover, a Scale-Invariant Feature Transform (SIFT) in which local feature data expresses inclination information of a local area by an actual number, a Speeded-Up Robust Features (SURF), and the like are exemplified. Besides, a Binary Robust Independent Elementary Features (BRIEF) in which a magnitude relationship of brightness is expressed by binary, an Oriented FAST and Rotated BRIEF (ORB), and the like are exemplified.

Figure 3:
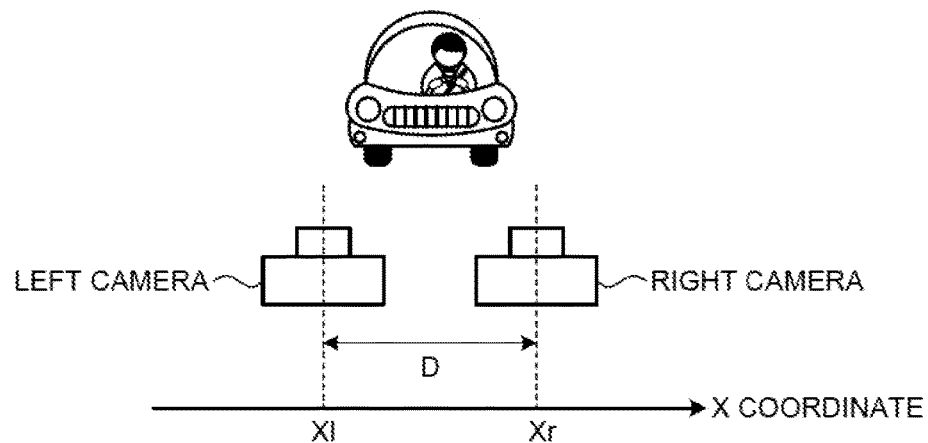
FIG. 3 is an explanatory view of an example of a method of calculating a three-dimensional point from a disparity image.
Figure 4:
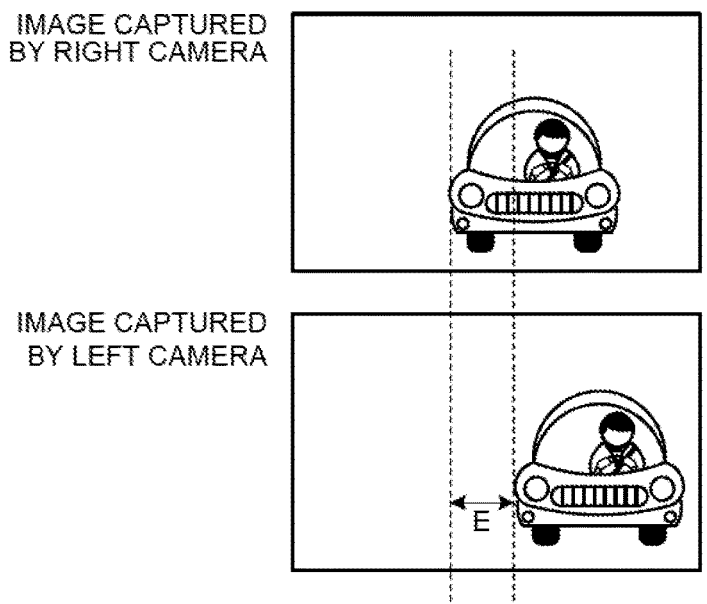
FIG. 4 is an explanatory view of an example of a method of calculating a three-dimensional point from a disparity image.

Here, a method of calculating a three dimensional position coordinate (three dimensional point) of a feature point in the world coordinate system from a disparity image of time-series images will be explained. FIGS. 3 and 4 are explanatory views of an example of the method of calculating a three dimensional point from a disparity image. As illustrated in FIG. 3, it is assumed that there are two cameras (stereo camera). A lens center of a left camera in the X coordinate is "xl", a lens center of a right camera is "xr", and a distance between the cameras is "D". As illustrated in FIG. 4, a disparity between the left camera and the right camera is "E". In this case, a three dimensional point (X, Y, Z) is calculated by following Equations (1) to (3).

$$Z = Df/(xl-xr) \quad (1)$$

$$X = (Z/f) \times xr \quad (2)$$

$$Y = (Z/f) \times yr \quad (3)$$

Here, a symbol "D" indicates a distance between cameras, a symbol "f" indicates a focal length of a camera, and a symbol "xl–xr" indicates a disparity E in Equations (1) to (3).

The explanation will be continued with reference to FIG. 2 again. The second calculator 13 tracks the object extracted by the first calculator 12 with the time series images input in sequence from the image receiver (camera) 11 and calculates an optical flow of the object. Specifically, concerning a feature point of the object extracted by the first calculator 12, the second calculator 13 treats a time series image input at the beginning as a search image and tracks a position of the feature point of the object in time series images input in sequence to calculate a movement vector (optical flow) along which the feature point of the objet moves. Here, the optical flow, which is a movement, expressed by a vector, of an object in a digital image, is used mainly for a detection of a moving object, an analysis of the motion thereof, and the like.

Each feature point is provided with information such as identification information (ID) that identifies a feature point, the number of times when the feature point is tracked, and a coordinate (x, y) on an image. In other words, a plurality of feature points are identified by respective pieces of identification information (ID), for example. As one example of the number of times when a feature point is tracked, a numeral "0" may be defined as a tracking failure, a numeral "1" as a new feature point, and a numeral "more than 1" as the number of times when the tracking ends in success, for example.

Figure 5:
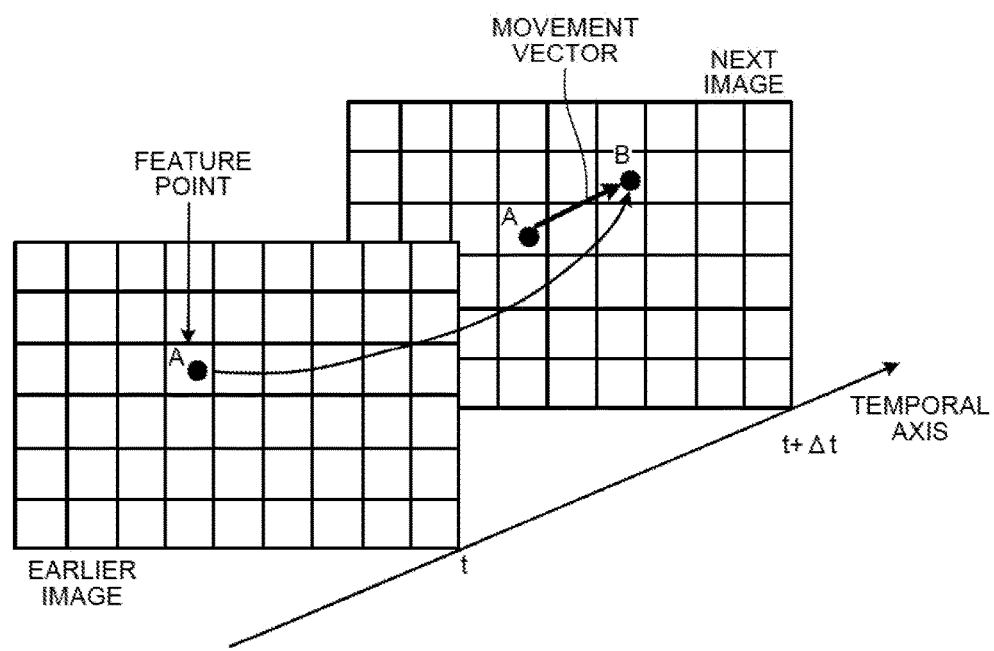
FIG. 5 is an explanatory view of an example of an optical flow.

Here, a movement vector of an optical flow will be explained with reference to FIG. 5. FIG. 5 is an explanatory view of an example of an optical flow. As illustrated in FIG. 5, when a pixel A (feature point) of a feature point in an earlier image at a time point t in a temporal axis moves to a different position, i.e., a pixel B in a next image at a time point t+Δt in the temporal axis, a vector expressing the movement (a vector from A toward B) is a movement vector of the feature point. The optical flow is a result of calculation of the movement vector for each pixel by using a temporal and spatial change in a moving image, for example, a change in brightness distribution. Here, the time point t in the temporal axis indicates an arbitrary time point.

The explanation will be continued with reference to FIG. 2 again. The moving object eliminator 14 calculates a difference between a coordinate of a first vanishing point (motion vanishing point) generated by a movement of the image receiver 11 and a coordinate of a second vanishing point (moving object vanishing point) generated by a movement of the object based on the optical flow (movement vector of the object) calculated by the second calculator 13, and eliminates an image area of the object from the time series images when the object is determined to be a moving object based on the calculated difference.

Specifically, the moving object eliminator 14 calculates the coordinate of the first vanishing point (motion vanishing point) generated by the movement of the image receiver (camera) 11 and the coordinate of the second vanishing point (moving object vanishing point) generated by the moving object based on information of the movement vector obtained by the second calculator 13. The moving object eliminator 14 then determines whether or not the difference between the coordinates of respective vanishing points is within a range of a preset threshold and determines which the object is, a motionless object or a moving object. When determining that the object extracted from the time series images input from the image receiver (camera) 11 is a moving object, the moving object eliminator 14 eliminates an image area indicating the object from the time series images. Specifically, it is possible to create an initial map not including three dimensional position coordinate (three dimensional point) information of a moving object such as a human being and a car in the world coordinate system.

The moving object eliminator 14 further integrates groups whose distance of coordinates of vanishing points is not more than a preset threshold, determines the integrated group whose number of optical flows (movement vectors) for the calculation of vanishing points is small as a moving object, and eliminates the image area of the object from the time series images.

Specifically, the integration unit 21 first divides the time series images into image areas for each kind of image and treats optical flows (movement vectors) included in each of the divided image areas as one group. Next, the vanishing point calculator 22 calculates a coordinate of a vanishing point based on the movement vector of the object of the optical flow for each group. After that, the moving object eliminator 14 further integrates groups whose distance of coordinates of vanishing points is not more than the preset threshold, determines the integrated group whose number of movement vectors of optical flows for the calculation of vanishing points is small as a moving object, and eliminates the image area of the object from the time series images.

When a distance between image areas is close by using information of a distance image of the plurality of cameras, for example, the moving object eliminator 14 may make a determination as a moving object with no condition by judging the risk. Details will be explained with reference to the integration unit 21 and the vanishing point calculator 22 with reference to FIG. 9 to be explained later.

The moving object eliminator 14 determines a moving object and eliminates the image area of the object from the time series images based on a value of a calculated inner product of: a vector of a direction obtained by connecting the coordinate of the object (feature point under tracking) in the time series images input in sequence and the coordinate of the obtained first vanishing point (motion vanishing point) and; the movement vector of the optical flow calculated by the second calculator 13.

While the details will be explained with reference to FIG. 11 to be explained later, the moving object eliminator 14 calculates, as cos θ from the inner product of the vectors, a difference between the vector of the direction connecting the motion vanishing point and the feature point under tracking and the movement vector of the optical flow calculated by the actual tracking of the feature point, determines that the object is a moving object when the calculated cos θ exceeds a preset threshold (when the difference is large and when the declination is large), and eliminates the image area of the object from the time series images.

Figure 6:
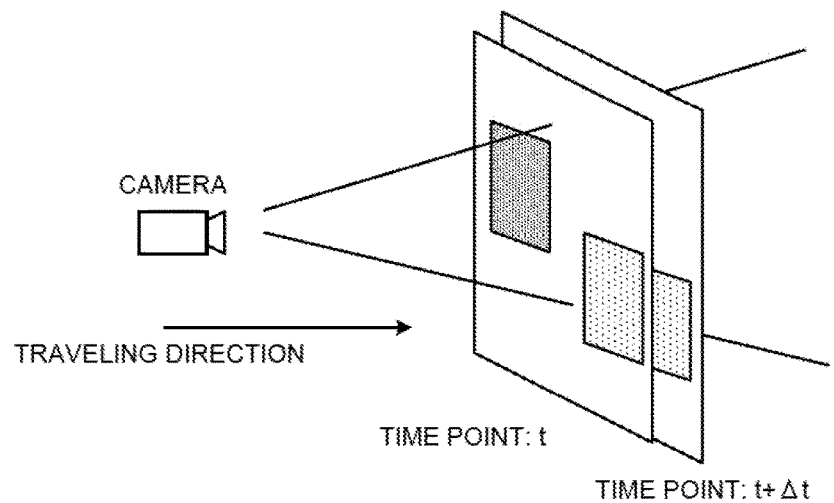
FIG. 6 is an explanatory view of an example of a motion vanishing point.
Figure 7:
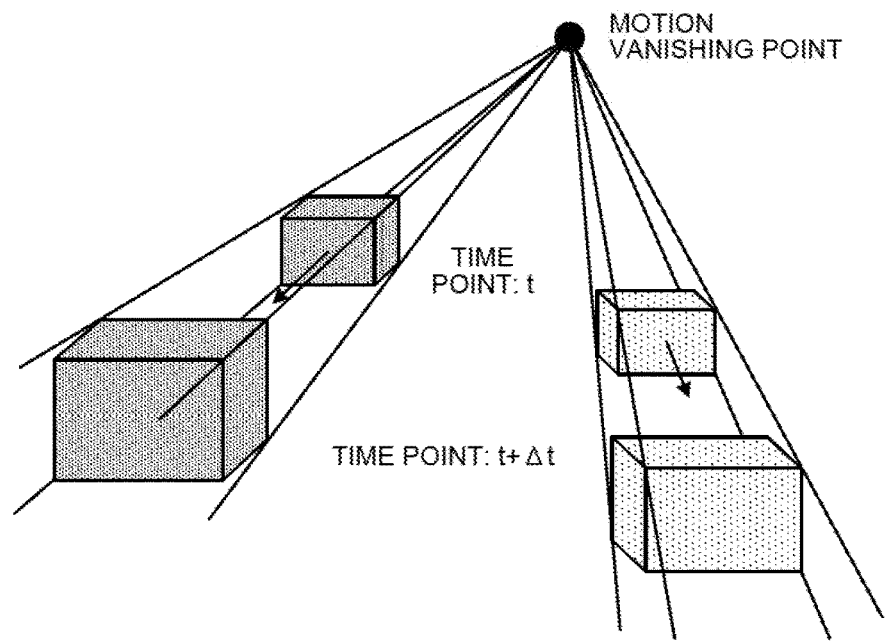
FIG. 7 is an explanatory view of an example of a motion vanishing point.

Here, the motion vanishing point will be explained with reference to FIGS. 6 and 7. FIGS. 6 and 7 are explanatory views of an example of the motion vanishing point. When the camera (image receiver) 11 mounted on a car moves forward to a travelling direction for example as illustrated in FIG. 6, the camera 11 receives images in time series while moving. In the example in FIG. 6, an image at the time point t and an image at the time point t+Δt are to be received. Specifically, successive images are input toward the travelling direction.

As illustrated in FIG. 7, the image of the object at the time point t becomes small (locates away) and the image of the object at the time point t+Δt becomes large (locates close) since the camera (image receiver) 11 moves. In FIG. 7, it is possible to calculate the motion vanishing point by using an intersection of straight lines which are extended from optical flows of corners in the image, obtained from the camera 11, of the object at the time point t and corners in the image of the object at the time point t+Δt. The vanishing point illustrated in FIG. 7 is not a vanishing point on the image but the motion vanishing point, which is different from the vanishing point on the image. It is possible to estimate the movement of the camera 11 itself by using a trajectory of the motion vanishing point illustrated in FIG. 7.

The explanation will be continued with reference to FIG. 2 again. When an obstacle image which is included in the distance image calculated by the distance image calculator 26 overlaps an obstacle-masked image which is stored in the storage unit 25 and will be explained later with reference to FIG. 12 and when the distance image and the obstacle image is at not more than a preset distance, the moving object eliminator 14 determines the obstacle image as a moving object and eliminates the image area of the object from the time series images.

The moving object eliminator 14 determines an image area which is in contact with an image area of the road surface as a moving object based on the image area of the road surface received from the road surface identifying unit 27 and eliminates the image area of the object from the time series images.

The moving object eliminator 14 uses the RANSAC (RANdom SAmple Consensus) algorithm to approximate a feature point of a background area included in the time series images by a quadratic curve, determine a feature point away from the quadratic curve as a moving object, and eliminates an image area of an object corresponding to the feature point from the time series images. In other words, the RANSAC algorithm is used to approximate a property, smoothly changing with respect to the x direction, of the optical flow of the background area by the quadratic curve, determine an outlier of the quadratic curve as a moving object, and eliminate the object.

The overlapping point eliminator 15 performs an association about whether or not the object newly extracted by the first calculator 12 is the same as the object under tracking by the second calculator 13.

When determining that the object newly extracted by the first calculator 12 is the same as the object under tracking by the second calculator 13, the overlapping point eliminator 15 eliminates the object newly extracted and stops the tracking of the object. In other words, when the newly extracted object and the object which is currently under tracking are the same, the newly extracted object which overlaps in fact is eliminated to stop the tracking for calculating an optical flow.

The storage controller 16 performs a control of causing the storage unit 25 to store map information including a coordinate of an object not eliminated by the moving object eliminator 14 and the overlapping point eliminator 15 in the world coordinate system. Specifically, the storage controller 16 causes the storage unit 25 to store initial map information generated in the map creation apparatus 10. When the map information is updated by the update unit 17, the storage controller 16 performs a control of causing the storage unit 25 to store the updated map information. The storage controller 16 may cause storage of the map information as a map database. Moreover, the map database is not limited to the configuration of being provided in the storage unit 25 and may be provided in an external device (server device) with which a communication is allowed, for example.

Besides, if the storage controller 16 performs a control of causing a storage of not only the current map information but also map information in the past driving, it is possible to improve robustness under an adverse environment such as rain, snow, and night time.

The update unit 17 calculates an error between a coordinate of the object in the camera coordinate system that indicates a coordinate system based on the image receiver 11 and a coordinate as a result of re-projection in the camera coordinate system of the coordinate of the object in the world coordinate system in the map information stored in the storage unit 25, and deletes the map information of the object (coordinate of the object in the world, coordinate system) stored in the storage unit 25 and updates map information when the calculated error is not less than a preset threshold.

In other words, the map information updated by the update unit 17 is initial map information from which a moving object is eliminated. The update unit 17 is therefore capable of creating initial map information in which a moving object is eliminated from the time series images and which includes information of a coordinate of a motionless object (landmark) in the world coordinate system and is applicable to a self-position estimation.

Figure 8:
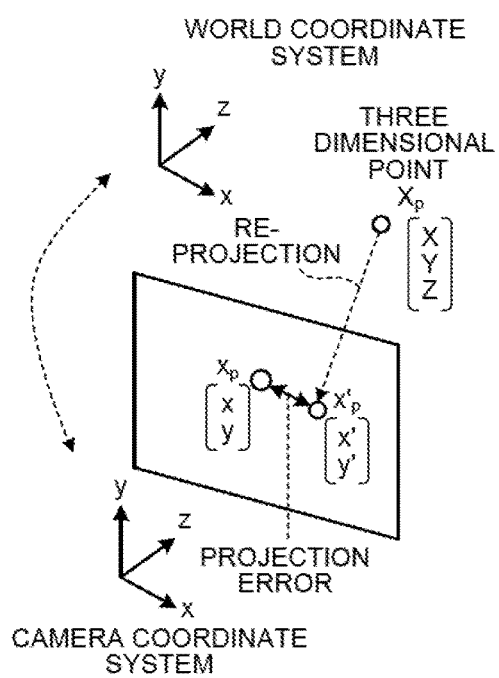
FIG. 8 is an explanatory view of a coordinate which is re-projected in a camera coordinate system from a coordinate of an object in a world coordinate system.

Here, an error between an object coordinate in the world coordinate system and a coordinate re-projected in the camera coordinate system will be explained with reference to FIG. 8. FIG. 8 is an explanatory view of a coordinate which is re-projected in the camera coordinate system from a coordinate of an object in the world coordinate system. A coordinate (X, Y, S) of a three dimensional point Xp illustrated in FIG. 8 corresponds to a coordinate of a three dimensional position (three dimensional point) of an object (feature point), calculated by the first calculator 12 through extracting an image area indicating an object from the time series images input from the image receiver (camera) 11, in the world coordinate system.

The update unit 17 first obtains a coordinate xp(x, y) in the camera coordinate system of the object (feature point) extracted from the time series images input from the image receiver 11. The update unit 17 next obtains the coordinate Xp(X, Y, Z) of the object (feature point) in the world coordinate system from the map information stored in the storage unit 25. The update unit 17 then transforms the coordinate Xp(X, Y, Z) into a coordinate in the camera coordinate system and re-projects the transformed coordinate x'p(x', y') onto the camera coordinate system.

Specifically, the three dimensional coordinate Xp(X, Y, Z) of the object (feature point) in the world, coordinate system is transformed into the two dimensional coordinate x'p(x', y') in the camera coordinate system by using a transform matrix. Here, an arbitrary expression may be applied for a transform matrix by which at transform from the three dimensional coordinate to the two dimensional coordinate is made.

The example in FIG. 8 illustrates a case where the coordinate xp(x, y) of the object (feature point) extracted from the time series images and the coordinate x'p(x', y'), which is re-projected after being transformed from the coordinate Xp(X, Y, Z) of the object (feature point) from the map information stored in the storage unit 25, are not the same and there is an error (projection error).

The update unit 17 calculates an error (projection error) between the coordinate xp(x, y) and the coordinate x' p (x', y') illustrated in FIG. 8. The update unit 17 then deletes (initializes) the map information of the object (object coordinate in the world coordinate system) stored in the storage unit 25 and updates map information when the calculated error (projection error) is not less than a preset threshold. Here, the threshold for the error (projection error) can be arbitrarily set.

In transforming the coordinate xp(x, y) in the camera coordinate system of the object (feature point) in the time series images into the coordinate Xp(X, Y, Z) in the world coordinate system, it is possible to obtain the coordinate Xp(X, Y, Z) of the object in the world coordinate system by an inverse transform of the transform matrix explained above.

When having extracted a new object from the time series images input from the image receiver (camera) 11, the update unit 17 adds the new object (feature point) to the map information to update the map information when the error (projection error) between the coordinate xp(x, y) of the object (feature point) in the time series images in the camera coordinate system and the coordinate x'p(x', y') which is obtained by transforming the coordinate of the three dimensional position (three dimensional point) of the object (feature point), calculated by the first calculator 12, in the world coordinate system and is projected to the camera coordinate system is not less than the preset threshold and when a disparity obtained from the disparity image of the time series images is not less than the preset threshold. It is possible to create an initial map by adding the coordinate of the object (feature point) in the world coordinate system to the map information in the course of moving. Here, the threshold for the error (projection error) and the threshold for the disparity can be set arbitrarily.

The explanation will be continued with reference to FIG. 2 again. Based on the coordinate of the object (three dimensional point of the feature point) in the world coordinate system, the estimation unit 18 estimates a transform matrix from the world coordinate system to the camera coordinate system that indicates a coordinate system based on the camera (image receiver) 11 and estimates a rotation angle indicating a position and an attitude, with respect, to the object, of the camera (image receiver) 11 that inputs images based on the transform matrix.

In other words, the estimation unit 18 calculates a position and a direction of the camera (image receiver) 11 with respect to the object. Specifically, the estimation unit 18 calculates a transform parameter [R|t] matrix by which the positional coordinate of the object in the world coordinate system is transformed for projection onto the camera coordinate system, Here, the symbol "R" indicates a rotation matrix and the symbol "t" indicates a translation vector.

In other words, the estimation unit 18 uses the coordinate Xp(X, Y, Z) of the object (feature point), stored in the storage unit 25, in the world coordinate system and the coordinate xp(x, y) of the object (feature point) in the time series images in the camera coordinate system to calculate the transform parameter [R|t] matrix for performing a linear transform of the world coordinate system into the camera coordinate system, as already explained with reference to FIG. 8. As explained above, an arbitrary expression can be applied as the transform parameter [R|t] matrix for transform from three dimensional coordinate to two dimensional coordinate.

Next, function units working in cooperation with the moving object eliminator 14 and the storage controller 16 will be explained.

The integration unit 21 divides the time series images into image areas for each image kind and integrates optical flows for each of the divided image areas in one group. Specifically, the first calculator 12 extracts feature points of a plurality of objects from the time series images and calculates coordinates of feature points of the plurality of objects in the world coordinate system from the disparity images input from the plurality of image receivers 11. The second calculator 13 tracks the extracted feature points of the plurality of objects in the time series images input in sequence to calculate optical flows of the plurality of objects. The integration unit 21 then divides the time series images input into image areas for each kind in the image such as sky, background (left), background (right), human being, road surface, and the like. The integration unit 21 next integrates the optical flows calculated by the second calculator 13 into one group for each of the divided image areas.

Figure 9:
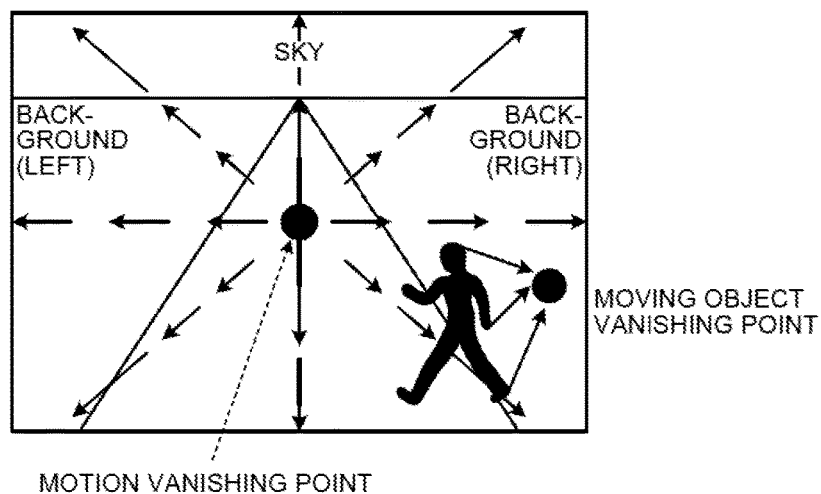
FIG. 9 is an explanatory view of a division into image areas of time series images and an integration of optical flows.

Here, a flow of dividing the time series images into image areas for each kind in the image and integrating optical flows for each of the divided image areas will be explained. FIG. 9 is an explanatory view of the division into image areas of time series images and the integration of optical flows.

As illustrated in FIG. 9, the integration unit 21, for example, performs a division into image areas such as sky, background (left), background (right), human being, and road surface, treats optical flows (movement vectors) included in an area for the sky as one group, treats optical flows (movement vectors) included in an area for the background (left) as one group, treats optical flows (movement vectors) included in an area for the background (right) as one group, treats optical flows (movement vectors) included in an area for the human being as one group, and treats optical flows (movement vectors) included in an area for the road surface as one group.

For a method of the division into image areas, there are some methods including a method of performing an area division based on a distance image by a plurality of cameras and a method of performing an area division based on a gradient (edge) of values in brightness of an image. If the area division cannot be done clearly, a processing for noise elimination, expansion, shrinkage, and the like is assumed to be performed as appropriate. Thereafter, the vanishing point calculator 22 to be explained later calculates a vanishing point for each group in which optical flows (movement vectors) are integrated.

The explanation will be continued with reference to FIG. 2 again. The vanishing point calculator 22 calculates a coordinate of a vanishing point based on the optical flow (movement vector of the object) for each group which is integrated into one group by the integration unit 21 from the optical flows calculated by the second calculator 13 for each image area. The moving object eliminator 14 integrates groups whose coordinates of vanishing points are close to each other further into one group. The function of further integrating groups may not be limited to the moving object eliminator 14 and may be provided in the vanishing point calculator 22.

For the determination on whether or not the coordinates are close to each other, it is configured to determine that the coordinates are close to each other when a distance between the coordinates of the vanishing points is not more than a preset threshold and that the coordinates are far to each other when the distance exceeds the threshold. Here, the threshold can be set arbitrarily.

After the vanishing point calculator 22 calculates the vanishing point, the moving object eliminator 14 determines, with respect to the integrated group, that an object whose number of movement vectors for calculating a vanishing point is small as a moving object under a condition that the background takes up higher proportion than a moving object, and eliminates the image area of the objet from the time series images.

In the example in FIG. 9, since the number of optical flows (movement vectors) for calculating the moving object vanishing point of the human being is three as illustrated, for example, the moving object eliminator 14 determines the human being as a moving object based on a determination that the number of optical flows thereof is smaller than the others, and eliminate the image area of the human being (object) from the time series images.

When a distance to the image area (human being) is short for example, the moving object eliminator 14 may determine that the human being is a moving object with no condition by judging the risk by using information of a distance image by the plurality of cameras.

The explanation will be continued with reference to FIG. 2 again. The movement information calculator 23 at least uses a speed at which the image receiver (camera) 11 moves and a steering angle of a wheel to calculate movement information including a moving speed and a moving direction of the image receiver 11. Specifically, the movement information calculator 23 at least uses speed information of a car and steering angle information of a tire obtained from a CAN (Controller Area Network) working as a core protocol of an in-car network and the like to calculate the moving speed and the moving direction of the car.

Figure 10:
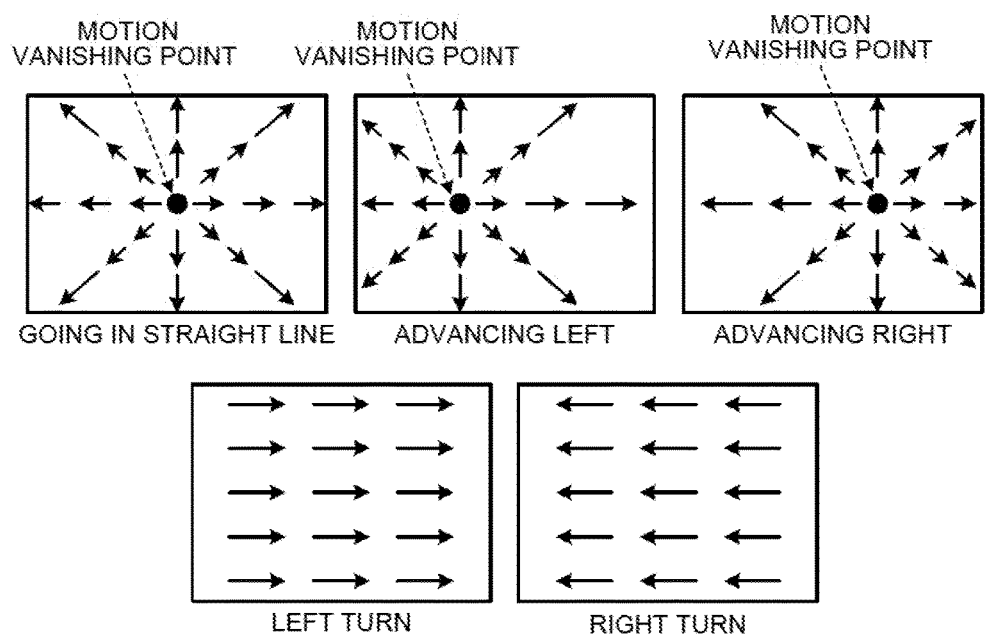
FIG. 10 is an explanatory view of a coordinate of the motion vanishing point.
Figure 11:
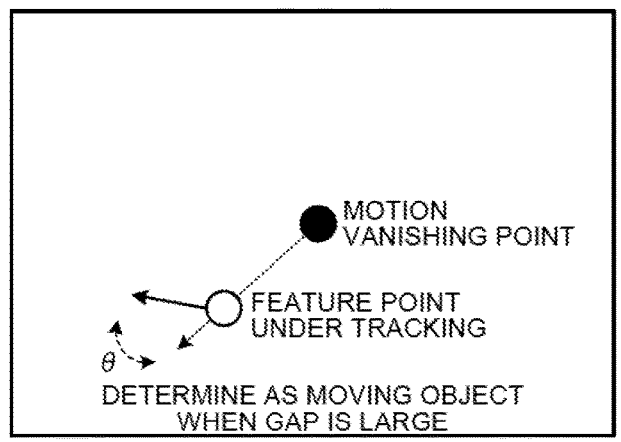
FIG. 11 is an explanatory view of a coordinate of the motion vanishing point.

The motion vanishing point obtaining unit 24 obtains a coordinate of the first vanishing point (motion vanishing point) generated by the movement of the image receiver (camera) 11 from the time series images input in sequence based on the movement information calculated by the movement information calculator 23, FIGS. 10 and 11 are explanatory views of a coordinate of the motion vanishing point. The motion vanishing point obtaining unit 24 searches and obtains a motion vanishing point which is generated on an image by the movement of the car itself, for example, from the motion vanishing point patterns illustrated in FIG. 10 based on the movement information including the moving speed and the moving direction of the car calculated by the movement information calculator 23, for example.

Examples of motion vanishing point patterns are illustrated in FIG. 10. In the example in FIG. 10, the motion vanishing point locates at the center part of the image when the image receiver (camera) 11 moves in a straight line. The motion vanishing point locates at a left side from the center of the image when the image receiver (camera) 11 advances a left. The motion vanishing point locates at a right side from the center of the image when the image receiver (camera) 11 advances a right. Since the direction of the movement vector becomes constant to the left or to the right in the cases of a left turn and a right turn while the motion vanishing point does not locate on the image, it is possible to determine that a movement vector presenting a motion different from the constant movement vector is an optical flow (movement vector) of a moving object.

As illustrated in FIG. 11, the moving object eliminator 14 determines a moving object and eliminates the image area of the object from the time series images based on the value of a calculated inner product between the vector in the direction obtained by connecting the coordinate of the object (feature point under tracking) in the time series images input in sequence and the coordinate of the obtained first vanishing point (motion vanishing point), and the movement vector of the optical flow calculated by the second calculator 13.

In the example in FIG. 11, the difference between the vector in the direction obtained by connecting the motion vanishing point and the feature point under tracking and the vector of the optical flow obtained indeed by the tracking of the feature point is calculated as $\cos\theta$ from the inner product of the vectors. The moving object eliminator 14 then determines the object as a moving object and eliminates the image area of the object from the time series images when the calculated $\cos\theta$ exceeds a preset threshold (when the difference is large and when the declination is large). Here, the threshold can be set arbitrarily.

The explanation will be continued with reference to FIG. 2 again. The storage unit 25 stores map information including the coordinate of the object in the world coordinate system. The storage unit 25 stores map information including a coordinate, in the world coordinate system, of an object which is not eliminated by the moving object eliminator among objects extracted by the first calculator 12 from the time series images.

The storage unit 25 stores patterns of movement vector (motion vanishing point patterns) of the coordinate of the first vanishing point (motion vanishing point) generated by the movement of the image receiver (camera) 11. Here, the motion vanishing pattern is the same as what is explained with reference to FIG. 10.

The storage unit 25 stores an obstacle-masked image which indicates an image area of an obstacle and will be explained with reference to FIG. 12 later. Here, the storage unit 25 may store the obstacle-masked image in advance. The storage unit 25 may store the obstacle-masked image as a database of an obstacle area prediction mask. The database of the obstacle area prediction mask may not be limited to the configuration of being provided in the storage unit 25 and may be configured to be provided in an external device (server device) with which a communication can be performed, for example.

The distance image calculator 26 calculates a distance image including an area of an obstacle image indicating an image area of an obstacle by using a disparity obtained from a disparity image of the time series images input from the image receiver 11. FIG. 12 is an explanatory view of examples of a stereo distance image and an obstacle-masked image. As illustrated in FIG. 12, the distance image calculator 26 calculates a stereo distance image obtained from a disparity of a disparity image of the time series images input from the plurality of cameras (image receivers) 11, for example. On this occasion, the distance image calculator 26 generates an obstacle area when a car, a human being, and other obstacles are present, for example.

Next, the moving object eliminator 14 determines the obstacle area as a moving object and eliminates the image area of the determined moving object (obstacle area) from the time series images when the generated obstacle area overlaps the obstacle-masked image and when the stereo distance image and the obstacle area locate at not more than a preset distance. Specifically, the moving object eliminator 14 determines, as a moving object, the image area which corresponds to the obstacle-masked image and whose distance to the obstacle area is close based on the information of the distance image calculated by the distance image calculator 26 and the information of the obstacle-masked image stored in advance in the storage unit 25.

Figure 12:
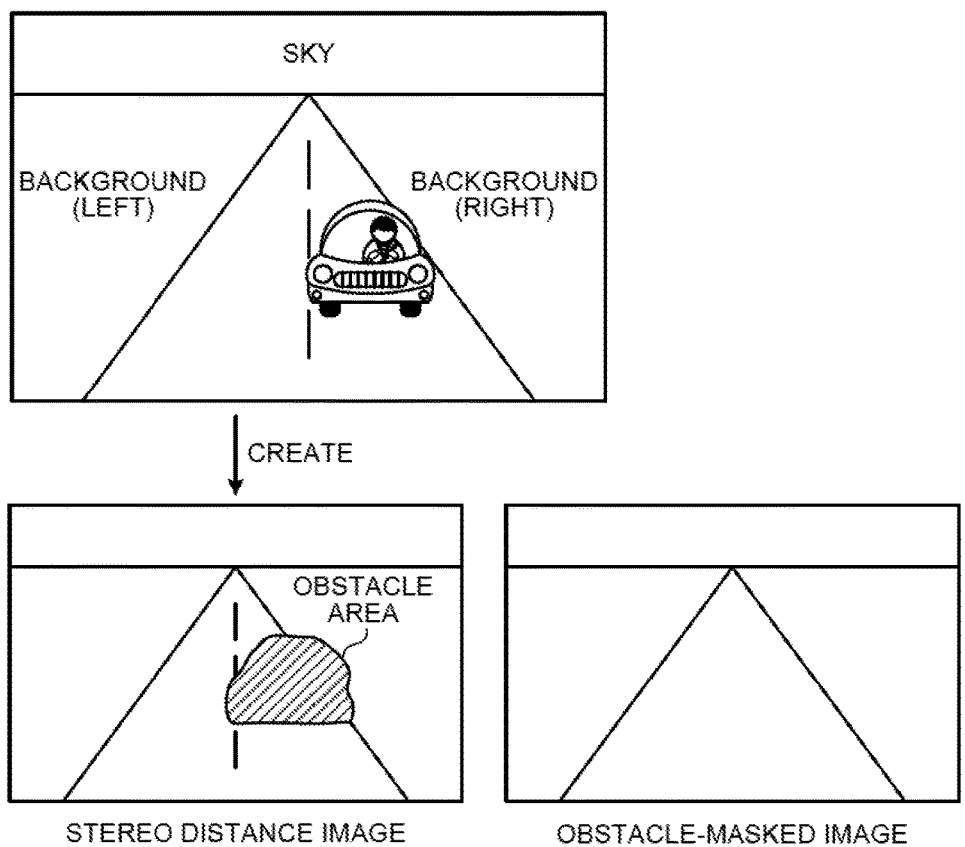
FIG. 12 is an explanatory view of examples of a stereo distance image and an obstacle-masked image.

In the example in FIG. 12, the movement information calculator 23 calculates the movement information including the moving speed and the moving direction of the image receiver 11 and the motion vanishing point obtaining unit 24 obtains the coordinate of the first vanishing point (motion vanishing point) generated by the movement of the image receiver (camera) 11 based on the movement information calculated by the movement information calculator 23. Next, the distance image calculator 26 generates a stereo distance image including the obstacle area indicating the image area of the obstacle, determines the obstacle area as a moving object, and eliminates the image area of the object from the time series images when the obstacle area included in the stereo distance image (distance image of the road surface) generated by the distance image calculator 26 overlaps the obstacle-masked image (distance image of the road surface in the example in FIG. 12) stored in the storage unit 25 and when the distance image and the obstacle area locate at not more than the preset distance. In other words, when the stereo distance image (distance image of the road surface) generated by the distance image calculator 26 corresponds the obstacle-masked image and the distance to the obstacle area included in the stereo distance image is determined to be close, the obstacle area is determined to be a moving object and the image area of the object is eliminated from the time series images.

The explanation will be continued with reference to FIG. 2 again. The road surface identifying unit 27 identifies an image area of the road surface from the time series images input in sequence. The road surface identifying unit 27 passes the specified image area of the road surface to the moving object eliminator 14 and causes the storage unit 25 to store the specified image area of the road surface. After that, the moving object eliminator 14 determines the image area which is in contact with the image area of the road surface as a moving object and eliminates the image area of the object from the time series images based on the image area of the road surface received from the road surface identifying unit 27. It is thereby possible to determine an object which is at rest on the road surface as a moving object and eliminate the object, for example.

Figure 13:
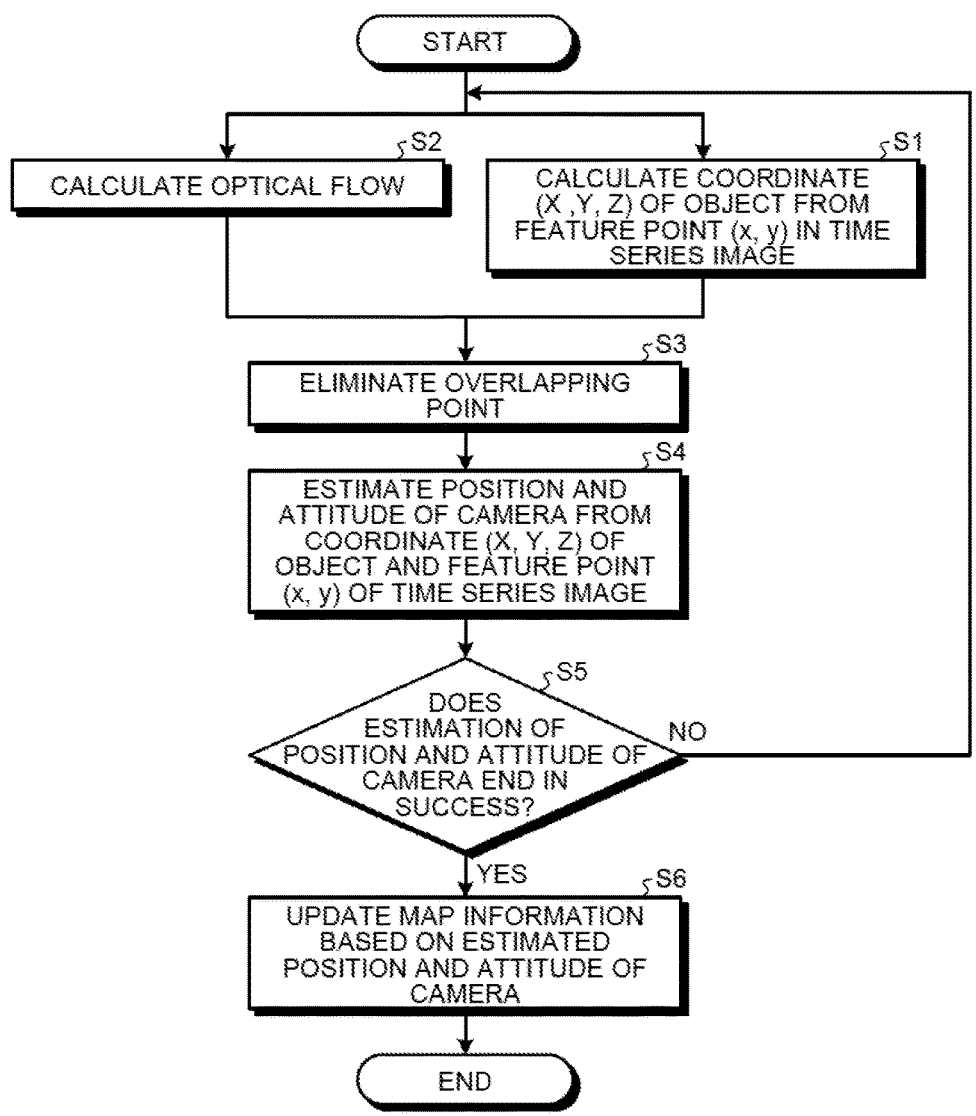
FIG. 13 is a flowchart explaining about an example of a processing operation of the self-position estimation apparatus according to the embodiment.

Next, a processing operation of the self-position estimation apparatus 100 according to the embodiment will be explained with reference to FIG. 13. FIG. 13 is a flowchart explaining an example of a processing operation of the self-position estimation apparatus according to the embodiment.

First, the first calculator 12 of the self-position estimation apparatus 100 extracts an image area of an object (feature point (x, y)) from the time series images input from the image receiver (camera) 11 and calculates a three dimensional position coordinate (X, Y, Z) of the object in the world coordinate system (step S1). The second calculator 13 tracks the extracted object with the time series images input in sequence from the image receiver (camera) 11 and calculates an optical flow of the object concurrently (step S2). Here, since there is no information of an object (feature point) as a tracking target in a time series image (frame) input at the beginning, the calculation processing of the optical flow of the object is started from a time series image input next (second frame).

Next, when performing an association of the object (feature point) newly extracted by the first calculator 12 and the object (feature point) under tracking by the second calculator 13 and determining the objects (feature points) is the same to each other, the overlapping point eliminator 15 eliminates the image area of the newly-extracted overlapping object from the time series image (step S3) and stops the tracking of the object. In other words, when the newly extracted object overlaps the object under tracking, it is possible by stopping the calculation of the optical flow of the object to reduce a load on the processing of the self-position estimation apparatus 100.

Next, the estimation unit 18 estimates the rotation angle indicating the position and the attitude, with respect to the object (feature point), of the camera (image receiver) 11 that inputs images based on the three dimensional position coordinate (X, Y, Z) of the object (feature point) in the world coordinate system and the coordinate (x, y) of the object (feature point) in the camera coordinate system indicating a coordinate system based on the camera (image receiver) 11 (step S4).

The estimation unit 028 next determines whether or not the estimation of the position and the attitude of the camera (image receiver) 11 ends in success (step S5). When the estimation does not end in success ("No" at step S5), the processing is to be continued by returning to steps S1 and S2.

When the estimation ends in success ("Yes" at step S5), the update unit 17 updates the map information based on the estimated position and attitude of the camera (image receiver) 11 (step S6). Specifically, the update unit 17 calculates an error between the coordinate (x, y) of the object (feature point) in the camera coordinate system and the coordinate (x', y') which is re-projected onto the camera coordinate system from the three dimensional position coordinate (X, Y, Z) of the object (feature point) in the world coordinate system of the map information stored in the storage unit 25, and deletes the map information of the object (feature point) (coordinate of the object in the world coordinate system) stored in the storage unit 25 and updates the map information when the calculated error is not less than the preset threshold. After that, the processing is ended.

Figure 14:
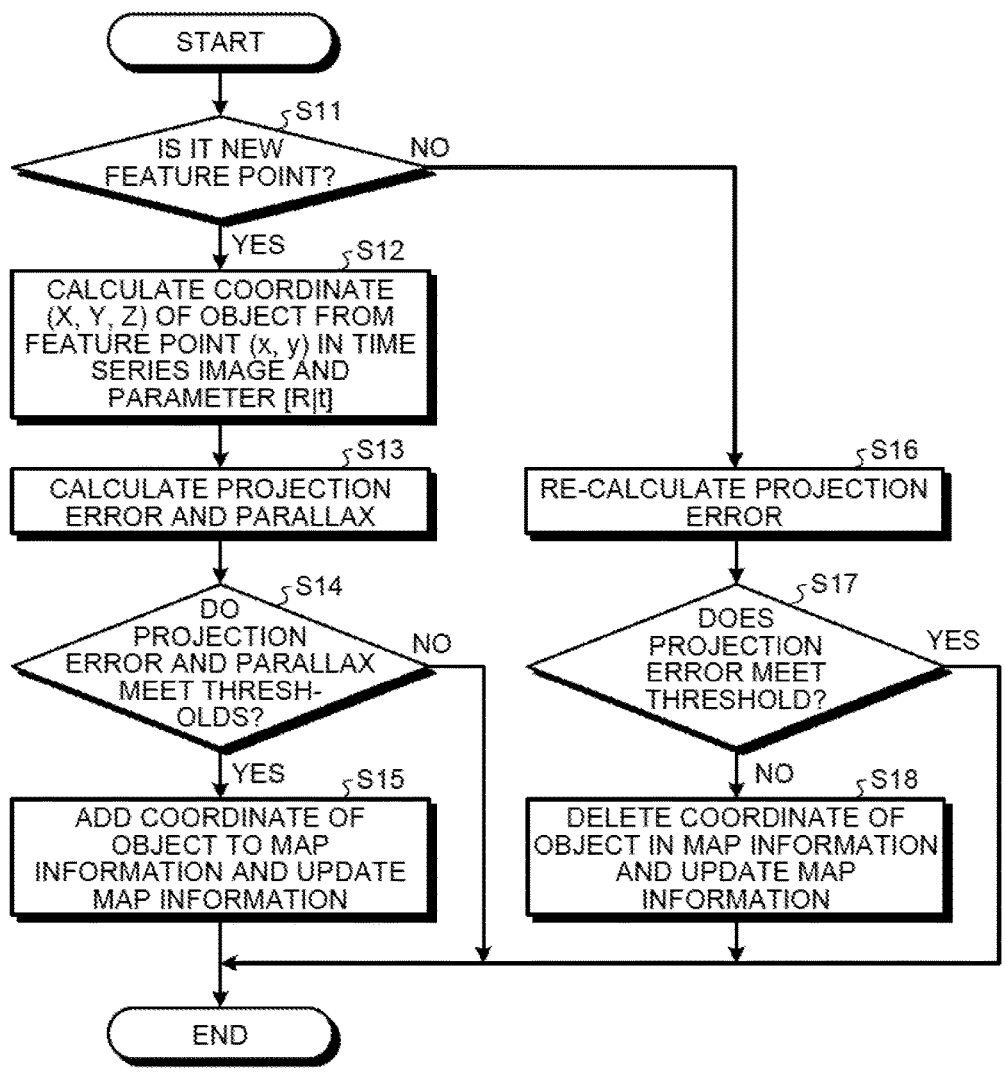
FIG. 14 is a flowchart explaining about an example of a processing of updating map information.

Next, details of the processing at step S6 in FIG. 13 will be explained with reference to FIG. 14. FIG. 14 is a flowchart explaining about an example of a processing of updating map information. The update unit 17 determines whether or not the object (feature point) is a new object (feature point) based on the estimated position and attitude of the camera (image receiver) 11 (step S11). When the object is a new object (feature point) ("Yes" at step S11), the update unit 17 calculates the three dimensional position coordinate (X, Y, Z) of the object (feature point) from the coordinate (x, y) of the object (feature point) in the time series images in the camera coordinate system and the transform parameter [R|t] by which the three dimensional coordinate in the world coordinate system is transformed into the two dimensional coordinate in the camera coordinate system (step S12).

Next, the update unit 17 calculates: a projection error between the coordinate (x, y) of the object (feature point) in the camera coordinate system and the coordinate (x', y') which is re-projected onto the camera coordinate system from the three dimensional position coordinate of the object (feature point) in the world coordinate system in the map information stored in the storage unit 25 by using the transform parameter [R|t] and; a disparity from a disparity image (step S13), and determines whether or not the calculated projection error and disparity meet preset thresholds (step S14).

When the projection error is not less than the threshold (the projection error does not meet the threshold) ("No" at step S14), the processing is ended. When the projection error is less than the threshold (the projection error meets the threshold) ("Yes" at step S14), the three dimensional positon coordinate (X, Y, Z) of the new object (feature point) is added to the map information stored in the storage unit 25 to update map information (step S15) and the processing is ended.

At step S11, when the object is not a new object (feature point) ("No" at step S11), the update unit 17 calculates the projection error explained at step S13 again (step S16). The update unit 17 next determines whether or not the re-calculated projection error meets the preset threshold (step S17).

When the projection error is less than the threshold (the projection error meets the threshold) ("Yes" at step S17), the processing is ended. When the projection error is not less than the threshold (the projection error does not meet the threshold) ("No" at step S17), the three dimensional position coordinate (X, Y, Z) of the object (feature point) of the map information stored in the storage unit 25 is deleted, the map information is updated (step S18), and the processing is ended.

As explained so far, an object (feature point) is extracted from the time series images input in sequence from the image receiver (camera) 11, the extracted object is tracked, and an optical flow of the object is calculated, for example, by causing the self-position estimation apparatus 100 to execute the above-explained processing in the embodiment. Then, the coordinate of the first vanishing point (motion vanishing point) generated by the movement of the image receiver (camera) 11 is obtained from the time series images input in sequence based on the calculated optical flow, and a difference between the coordinate of the first vanishing point (motion vanishing point) and the coordinate of the second vanishing point (moving object vanishing point) calculated based on the optical flow (movement, vector of the object) is calculated. The object whose calculated difference is large is determined to be a moving object and eliminated from the time series image, and map information including a coordinate of an object not eliminated in the world coordinate system is updated and stored. It is thus possible according to the embodiment to achieve an advantage of being capable of creating an initial map which is applicable to an estimation of self-position.

Programs to be executed in the self-position estimation apparatus 100 and the map creation apparatus 10 according to the embodiment may be provided by being recorded in a file of an installable format or of an executable format in a computer-readable recording medium such as a Floppy® disk, a CD (Compact Disk), a CD-R (Compact Disk-Recordable), a CD-ROM (Compact Disk Read Only Memory), a DVD (Digital Versatile Disk), an SD memory card (Secure Digital memory card), and a USB memory (Universal Serial Bus memory) as a computer program product, or may foe provided or distributed via a network such as the Internet. Programs of various kinds may be provided by being preloaded in a ROM and the like.

The configuration of the self-position estimation apparatus 100 provided with the map creation apparatus 10 according to the embodiment is only one example and it goes without saying that there could be a variety of configuration examples of the devices depending on a use application and a purpose.

According to an embodiment, there is an advantage in that an initial map can be created.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A map creation apparatus comprising a processor and a non-transitory storage medium storing one or more programs of instructions that, when executed by the processor of the map creation apparatus, cause the map creation apparatus to perform a method comprising:
    (a) receiving images in time series while the apparatus is moving;
    (b) extracting an image area indicating an object from the images received in (a) and calculating a coordinate of the object in a world coordinate system;
    (c) tracking the object in the extracted image area with the images input in sequence and calculating an optical flow of the object;
    (d) calculating a difference between a coordinate of a first vanishing point generated by the movement of the apparatus and a coordinate of a second vanishing point generated by a movement of the object based on the optical flow calculated in (c) and eliminating the image area of the object from the images when the object is determined to be a moving object based on the calculated difference;
    (e) storing map information including the coordinate of the object, not eliminated in (d), in the world coordinate system;
    (f) determining that an object newly extracted is same as the object under tracking, and eliminating the newly-extracted object and stopping the tracking, when it is determined that the object newly extracted is same as the object under tracking; and
    (g) calculating an error between (i) the coordinate of the object in a camera coordinate system that indicates a coordinate system based on the apparatus and (ii) a coordinate which is re-projected onto the camera coordinate system from a coordinate of the object in the world coordinate system in the map information; and deleting the map information of the object stored in (e) and updating the map information when the calculated error is not less than a preset threshold.

2. The map creation apparatus according to claim 1, wherein the method performed by the apparatus further comprises:
    extracting feature points of a plurality of objects from the images and calculating coordinates of the feature points of the plurality of objects in the world coordinate system from a disparity image input from plural image sources;
    extracting feature points of the plurality of objects with the images input in sequence and calculating optical flows of the plurality of objects;
    dividing the images into plural image areas for each image kind and integrating the optical flows as one group for each of the divided image areas;
    calculating a coordinate of a vanishing point based on the optical flow for each of the divided image areas; and
    integrating further the optical flows for each of the divided image areas whose distance between the coordinates of the vanishing points is not more than a preset threshold, determining the further-integrated optical flows as a moving object, and eliminating an image area of the object from the images.

3. The map creation apparatus according to claim 1, wherein the method performed by the apparatus further comprises:

using (i) a speed at which the apparatus moves and (ii) a steering angle of a car wheel, to calculate movement information including a moving speed and a moving direction of the apparatus; and obtaining a coordinate of the first vanishing point generated by the movement of the apparatus from the images input in sequence based on the movement information; and determining a moving object and eliminating the image area of the object from the images based on a value of a calculated inner product between a vector in a direction connecting the coordinate of the object in the images input in sequence and the obtained coordinate of the first vanishing point and a movement vector of the optical flow.

4. The map creation apparatus according to claim 2, wherein the method performed by the apparatus further comprises:

storing an obstacle-masked image indicating an image area of an obstacle; and using a disparity obtained from the disparity image to calculate a distance image including an obstacle image indicating the image area of the obstacle, wherein determining the obstacle image as a moving object and eliminating the image area of the object from the images when the obstacle image overlaps the obstacle-masked image and when the distance image and the obstacle image locate at not more than a preset distance.

5. The map creation apparatus according to claim 2, wherein the method performed by the apparatus further comprises:

identifying an image area of a road surface from the images; and determining an image area which is in contact with the identified image is of the road surface as a moving object, and eliminating the image area of the object from the images.

6. The map creation apparatus according to claim 1, wherein the method performed by the apparatus further comprises:

using a random sample consensus (RANSAC) algorithm to approximate a feature point of a background area included in the images by a quadratic curve, determining the feature point away from the quadratic curve as a moving object, and eliminating an image area of an object corresponding to the feature point from the images.

7. A map creation method comprising:

receiving images in time series by an image receiver while the image receiver moves;

extracting an image area indicating an object from the images received at the receiving and calculating a coordinate of the object in a world coordinate system;

tracking the object in the extracted image area with the images input in sequence and calculating an optical flow of the object;

calculating a difference between a coordinate of a first vanishing point generated by the movement of the image receiver and a coordinate of a second vanishing point generated by a movement of the object based on the optical flow calculated at the tracking, and eliminating the image area of the object from the images when determining the object as a moving object based on the calculated difference;

storing map information including the coordinate of the object, not eliminated at the calculating, in the world coordinate system;

eliminating, when determining that an object newly extracted at the extracting is same as the object under tracking at the tracking, the newly-extracted object and stop the tracking; and calculating an error between the coordinate of the object in a camera coordinate system that indicates a coordinate system based on the image receiver and a coordinate which is re-projected onto the camera coordinate system from a coordinate of the object in the world coordinate system in the map information, and deleting the stored map information of the object and updating the map information when the calculated error is not less than a preset threshold.

8. A non-transitory computer-readable recording medium with an executable program stored thereon and executed by a computer, wherein the program instructs the computer to perform:

receiving images in time series by an image receiver while the image receiver moves;

extracting an image area indicating an object from the images received at the receiving and calculating a coordinate of the object in a world coordinate system;

tracking the object in the extracted image area with the images input in sequence and calculating an optical flow of the object;

calculating a difference between a coordinate of a first vanishing point generated by the movement of the image receiver and a coordinate of a second vanishing point generated by a movement of the object based on the optical flow calculated at the tracking, and eliminating the image area of the object from the images when determining the object as a moving object based on the calculated difference;

storing map information including the coordinate of the object, not eliminated at the calculating, in the world coordinate system;

eliminating, when determining that an object newly extracted at the extracting is same as the object under tracking at the tracking, the newly-extracted object and stop the tracking; and calculating an error between the coordinate of the object in a camera coordinate system that indicates a coordinate system based on the image receiver and a coordinate which is re-projected onto the camera coordinate system from a coordinate of the object in the world coordinate system in the map information, and deleting the stored map information of the object and updating the map information when the calculated error is not less than a preset threshold.

* * * * *